United States Patent
Anjum et al.

(10) Patent No.: US 10,219,140 B2
(45) Date of Patent: Feb. 26, 2019

(54) VEHICLE COMMUNICATION IDENTIFIERS BASED ON LICENSE PLATE INFORMATION

(71) Applicant: Nokia Technologies Oy, Espoo (FI)

(72) Inventors: Omer Anjum, Espoo (FI); Carl Wijting, Espoo (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/320,841

(22) PCT Filed: Jun. 30, 2014

(86) PCT No.: PCT/US2014/044952
§ 371 (c)(1),
(2) Date: Dec. 21, 2016

(87) PCT Pub. No.: WO2016/003430
PCT Pub. Date: Jan. 7, 2016

(65) Prior Publication Data
US 2017/0164178 A1   Jun. 8, 2017

(51) Int. Cl.
*H04W 8/00* (2009.01)
*G06K 19/06* (2006.01)
(Continued)

(52) U.S. Cl.
CPC .......... *H04W 8/005* (2013.01); *G06K 7/1413* (2013.01); *G06K 7/1417* (2013.01);
(Continued)

(58) Field of Classification Search
CPC ....... H04W 4/00; H04W 4/008; H04W 4/046; H04W 4/80; H04W 8/00; H04W 8/005;
(Continued)

(56) References Cited

U.S. PATENT DOCUMENTS

| 7,633,407 B2 | 12/2009 | Yano et al. |
| 8,520,695 B1 | 8/2013 | Rubin et al. |

(Continued)

FOREIGN PATENT DOCUMENTS

| CN | 203192066 U | 9/2013 |
| DE | 102009026464 A1 | 12/2010 |

(Continued)

OTHER PUBLICATIONS

International Search Report and Written Opinion received for corresponding Patent Cooperation Treaty Application No. PCT/US2014/044952, dated Sep. 24, 2014, 11 pages.

(Continued)

*Primary Examiner* — Tri H Phan
(74) *Attorney, Agent, or Firm* — Mintz Levin Cohn Ferris Glovsky and Popeo, P.C.

(57) ABSTRACT

In one aspect, there is a method. The method may include receiving an image of a vehicle from a sensor. The image may include identifying information of the vehicle. The method may further include generating an identifier for the vehicle based on the identifying information. The method may also include sending a message to the vehicle. The message may include the generated identifier in order to identify a destination address of the message. The above-noted aspects and features may be implemented in systems, apparatuses, methods, and/or computer-readable media depending on the desired configuration.

20 Claims, 3 Drawing Sheets

(51) Int. Cl.
*G06K 7/14* (2006.01)
*G06K 9/00* (2006.01)
*G06K 9/20* (2006.01)
*G06K 9/78* (2006.01)
*G08G 1/017* (2006.01)
*H04N 7/18* (2006.01)
*H04W 4/00* (2018.01)
*H04W 4/04* (2009.01)
*H04W 84/18* (2009.01)
*H04W 4/80* (2018.01)
*H04W 84/00* (2009.01)

(52) U.S. Cl.
CPC ....... *G06K 7/1447* (2013.01); *G06K 9/00791* (2013.01); *G06K 9/209* (2013.01); *G06K 9/78* (2013.01); *G06K 19/06028* (2013.01); *G06K 19/06037* (2013.01); *G08G 1/017* (2013.01); *G08G 1/0175* (2013.01); *H04N 7/183* (2013.01); *H04W 4/046* (2013.01); *H04W 4/80* (2018.02); *H04W 84/18* (2013.01); *G06K 2209/15* (2013.01); *H04W 84/005* (2013.01)

(58) Field of Classification Search
CPC ...... H04W 84/005; H04W 84/18; G06K 7/14; G06K 7/1413; G06K 7/1417; G06K 7/1447; G06K 9/00; G06K 9/00791; G06K 9/20; G06K 9/78; G06K 9/209; G06K 19/06; G06K 19/06028; G06K 19/06037; G06K 2209/15; G08G 1/017; G08G 1/0175; H04N 7/18; H04N 7/183
See application file for complete search history.

(56) References Cited

U.S. PATENT DOCUMENTS

| | | | |
|---|---|---|---|
| 9,602,193 B1* | 3/2017 | Mendelson | G08G 1/14 |
| 2003/0109972 A1* | 6/2003 | Tak | G06Q 10/02 |
| | | | 701/31.4 |
| 2006/0015242 A1 | 1/2006 | Yoshida | |
| 2010/0085173 A1 | 4/2010 | Yang et al. | |
| 2011/0121991 A1 | 5/2011 | Basir | |
| 2011/0157363 A1* | 6/2011 | Polt | B60R 1/12 |
| | | | 348/149 |
| 2012/0143977 A1* | 6/2012 | Miche | H04L 67/12 |
| | | | 709/207 |
| 2013/0018705 A1* | 1/2013 | Heath | G08G 1/017 |
| | | | 705/13 |
| 2013/0039472 A1* | 2/2013 | Morton | G01V 5/0041 |
| | | | 378/88 |
| 2014/0309862 A1* | 10/2014 | Ricci | G01C 21/00 |
| | | | 701/36 |
| 2014/0309864 A1* | 10/2014 | Ricci | H04W 4/21 |
| | | | 701/36 |
| 2015/0058226 A1* | 2/2015 | Gupta | G06Q 20/367 |
| | | | 705/67 |

FOREIGN PATENT DOCUMENTS

| | | |
|---|---|---|
| GB | 2427787 A | 1/2007 |
| JP | H09-098125 A | 4/1997 |
| JP | 2000-068923 A | 3/2000 |
| JP | 2005-184212 A | 7/2005 |
| JP | 2007-048129 A | 2/2007 |
| JP | 2009-152773 A | 7/2009 |
| JP | 2013-058140 A | 3/2013 |
| WO | 01/65425 A1 | 9/2001 |
| WO | 2013/124033 A1 | 8/2013 |

OTHER PUBLICATIONS

"Metis Consortium Partner's Name", Metis, Retrieved on Feb. 20, 2018, Webpage available at: https://www.metis2020.com/.

Arnim et al., "Vehicle Identification Using Infrared Vision and Applications to Cooperative Perception", International Symposium on Intelligent Vehicles, 2007, 6 pages.

"Vehicle Registration Plates of Europe", Wikipedia, Retrieved on Feb. 21, 2018, Webpage available at : https://en.wikipedia.org/wiki/Vehicle_registration_plates_of_Europe.

"Vehicle Registration Plates of China", Wikipedia, Retrieved on Feb. 21, 2018, Webpage available at : https://en.wikipedia.org/wiki/Vehicle_registration_plates_of_China.

"Ovalstickers", Cafepress, Retrieved on Mar. 12, 2018, Webpage available at : https://www.cafepress.com/ovalstickers/268386.

"California Special Interest License Plates", Department of Motor Vehicles, Retrieved on Feb. 21, 2018, Webpage available at : https://www.dmv.ca.gov/portal/dmv/detail/online/elp/elp.

"Dedicated Short Range Communications", Wayback Machine, Retrieved on Mar. 16, 2018, Webpage available at : https://web.archive.org/web/20140520151344/http://www.its.dot.gov/DSRC.

Office Action received for corresponding European Patent Application No. 14750030.0, dated Nov. 2, 2017, 4 pages.

Office action received for corresponding Japanese Patent Application No. 2016-574435, dated Feb. 13, 2018, 4 pages of office action and 6 pages of office action translation available.

* cited by examiner

VEHICLE COMMUNICATION IDENTIFIERS BASED ON LICENSE PLATE INFORMATION

RELATED APPLICATION

This application was originally filed as Patent Cooperation Treaty Application No. PCT/US2014/044952 filed Jun. 30, 2014.

FIELD

The subject matter described herein relates to machine-to-machine communications.

BACKGROUND

The so-called "Internet of Things" has given rise to the need for devices, to communication among one another in a seamless way. For example, machines, such as refrigerators, washing machines, and the like, are increasingly seen as devices or machines that will need to communication via the Internet of Things.

SUMMARY

In one aspect, there is a method. The method may include receiving an image of a vehicle from a sensor. The image may include identifying information of the vehicle. The method may further include generating an identifier for the vehicle based on the identifying information. The method may also include sending a message to the vehicle. The message may include the generated identifier in order to identify a destination address of the message.

In some variations, one or more of the features disclosed herein including the following features may optionally be included in any feasible combination. The message may further include a communications request message to initiate communications with the vehicle. The communications request message may include a request for specific content to be provided in a response message sent by the vehicle. The message may include at least one of an instruction to the vehicle, a warning to the vehicle, a communication set-up information, or a quality of service information. The sensor may include at least one of a still camera, a video camera, a laser-based optical sensor, a scanning detector, a radio frequency imaging apparatus, or an electromagnetic sensor. In some example embodiments, the identifier is at least one of a radio identifier, an address, or a destination address. The radio identifier may include at least one of a wireless access in vehicular movements identifier, a direct short-range communications identifier, a wireless local area network identifier, or a cellular communications network identifier. The identifier may be an application level identifier. The image may include at least one of a license plate number for the vehicle, a registration number for the vehicle, a one dimensional bar code associated with the vehicle, or a two dimensional bar code associated with the vehicle. The image may include information determined from an electromagnetic sensor or an acoustic sensor. The generating may further include applying at least one of a hash function, a look-up table, or a function to the identifying information to generate the identifier. The hash function may be determined at least in part by a country code or a region code. In some example embodiments, the identifier may be locally unique. In some example embodiments, the identifier may be globally unique.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Like labels are used to refer to same or similar items in the drawings.

DETAILED DESCRIPTION

Connected vehicles may improve road and general traffic safety, efficient traffic flow including travel time, fuel consumption, emissions, and may also support a number of applications such as infotainment, e-commerce, and the like. Examples of scenarios of connected vehicles include Vehicle-to-Vehicle (V2V) communications and Vehicle-to-Infrastructure communications (V2I or vehicle to base station). According to some example embodiments, vehicles may include any form of transportation such as, for example, automobiles, trucks, lorries, motorcycles, boats, aircraft, and/or spacecraft.

In some example embodiments, vehicle license plate information may be used to determine an identifier used to direct communications to that vehicle. For example, when a first vehicle determines the license plate information of a second vehicle, the first vehicle may use the determined license plate information to initiate communications with the second vehicle. The first vehicle may determine the license plate information of the second vehicle from an image of the second vehicle that includes the first vehicle's license plate information. Alternatively or additionally, other image-based (or optical) features of the second vehicle may be used to determine a communications identifier, in accordance with some example embodiments. Moreover, any other type of electromagnetic and/or acoustic sensor may determine features of a vehicle that may be used to determine a communications identifier, in accordance with some example embodiments.

A first vehicle may read a license plate number, bar code (for example, quick response (QR) code), or other identifying marking on a second vehicle. In some example embodiments, the identifying marking may include the colors, shapes, and graphic features of the license plate on the second vehicle or of the vehicle itself. The identifying marking may also include an emblem or marking specific to a country. In some example embodiments, the license plate or marking may be called an address of the second vehicle. The first vehicle may transmit a short-range radio message to the address of the second vehicle (also referred to as a destination address). In some example embodiments, the short-range radio message may be referred to as a point-to-point message from the first vehicle to the second vehicle. In some example embodiments, a receiver in the second vehicle may be listening for messages containing the address of the second vehicle. When the second vehicle determines that a message is addressed to it, the second vehicle may perform instructions contained in the message without sending a response message, or the second vehicle may perform instructions contained in the message and send a response message back to the first vehicle.

In some example embodiments, a vehicle may be equipped with sensors including one or more optical sensors. The optical sensors may be used to form, or determine, the surroundings of the vehicle including the presence of other vehicles as well the presence of any fixed communications stations (for example, base station, access point) in the vicinity. In some example embodiments, the optical sensor may generate an image or other data that can be used to determine any nearby vehicles and/or fixed communication stations. In some example embodiments, an optical sensor may include a still camera, a video camera, a laser-based imaging device, a laser-based scanning device, or any other type of imaging or optical scanning device. In some example embodiments, the optical sensors may include radio frequency imaging or scanning devices and/or acoustic or ultrasonic devices. Information, such as license plate information, that is determined from one or more optical sensors and/or one or more images may be used to generate an identifier that may be used to communicate with the corresponding nearby vehicle and/or a base station. By determining optical features of nearby vehicles, discovery of those vehicles may also be accomplished. Discovery may include the determination that one or more other vehicles are nearby, and may also include the determination of one or more identifying optical features of the one or more other vehicles.

In some example embodiments, image recognition in images and/or video may determine license plate information to identify one or more nearby vehicles. Radio identifiers (Radio ID, also referred to herein as communication identifiers) may be generated from the license plate information, which can then be used to set up radio links between the two vehicles. The generated radio identifier may be used in various communication systems including V2V and V2I. The communication system can be based on, for example, IEEE 802.11p wireless access in vehicular movements (WAVE), Dedicated Short Range Communications (DSRC) (see, for example, http://www.its.dot.gov/DSRC/), wireless local area network (WLAN), a 3rd Generation Partnership Project (3GPP) standard such as Long Term Evolution (LTE) and/or other radio technologies. In some example embodiments one or more of the nearby vehicles may be an access point, a base station, a Node B and/or evolved node B, or any other type of radio base station, relay station, or intermediary communications station.

In some example embodiments, determining the presence of nearby vehicles may provide information about the position, velocity, and acceleration of the nearby vehicles. Position, velocity, and acceleration information may be used for collision avoidance or other uses.

In some example embodiments, the number of messages broadcast by vehicles may be reduced due to the radio identifiers generated based on license plate information or information. The number of broadcast messages may be reduced because vehicles may establish direct communications to specific vehicles rather than each vehicle setting-up a communication link to a base station. In some example embodiments, the radio identifiers of vehicles may be simplified by using the license plate information instead of creating a new identifier for each vehicle in addition to the license plate information. In some example embodiments, the data latency may be reduced because the links between vehicles are point-to-point rather than via a fixed infrastructure.

In some example embodiments, the radio identifier may be generated by applying a function, such as a hash function or other mathematical function/transformation, to the license plate information 145 or other recognizable feature of the vehicle. The hash function may be determined at least in part by a country code or a region code. For example, a country code or symbol on the license plate or elsewhere on the vehicle may be recognized, and the hash function may depend on the recognized country code or symbol. In some embodiments, the hash function may be manually configured and/or received from another vehicle or network.

Although some of the examples refer to generating a radio identifier for machine-to-machine communications based on license plate information, the radio identifier may be generated from other detected or determined information, such as registration information, and/or information in a one dimensional or two dimensional bar code on the vehicle.

Figure 1:
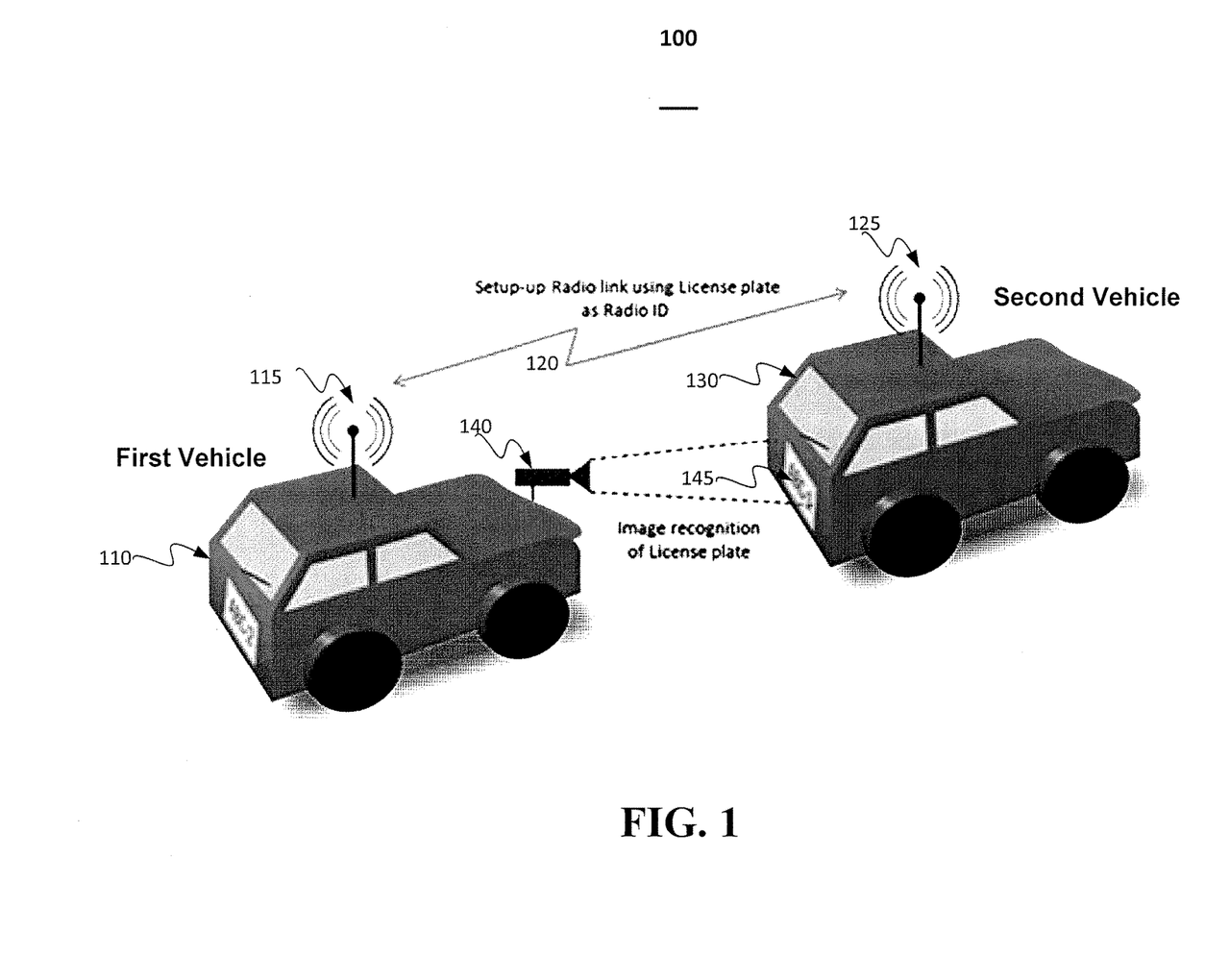
FIG. 1 depicts an example of a communication system for providing communications between vehicles, in accordance with some example embodiments.

FIG. 1 depicts an example of a communications system 100 for providing communications between vehicles, in accordance with some example embodiments. A first vehicle 110 may acquire an image/video of the license plate 145 of a second vehicle 130. The first vehicle 110 may generate a radio identifier for the second vehicle 130 based on the image/video. The first vehicle 110 may direct a communications request to the second vehicle by including the generated radio identifier for the second vehicle 130 in the request.

For example, if the license plate number is 12345, the license plate information may be used to generate a radio identifier that corresponds to that license plate number. The generated identifier may be the license plate number itself, such as 12345, or may be generated based on a function of that license plate number such as a hashing function applied to the license plate number.

The first vehicle 110 may establish direct communications with the second vehicle 130 by including the radio identifier (or address) in the communications request message or invitation. For example, a communications request message sent from the first vehicle to the second vehicle may include the radio identifier for the second vehicle that was generated by the first vehicle based on the second vehicle's license plate or other information. In this way, a communications request message may be directed to the second vehicle before the second vehicle has transmitted any information related to the request. In some example embodiments, the communications request message may include information in addition to the radio identifier. For example, the communications request message may include instructions for the second vehicle 130.

In some example embodiments, in addition to the radio identifier for the second vehicle, a second function may be applied to the license plate information to generate a security key. The security key may be sent along with the radio identifier from the first vehicle 110 to the second vehicle 130. In some example embodiments, the security key may be a function of the color of the car, bar code information on the car, or other feature of the car instead of, or in addition to, being a function of the license plate information.

In some example embodiments, the receiver in the second vehicle may listen for messages that contain its radio identifier. If the second vehicle receives a message containing its radio identifier, the second vehicle may perform according to instructions in the message. For example, the second vehicle may instructed to reply with a response message. Messages that do not contain the second vehicle's radio identifier may be ignored. In some example embodiments, instructions may be passed from the first vehicle to the second vehicle without the second vehicle transmitting any information directly to the first vehicle and without the second vehicle transmitting any information in a broadcast message to the first vehicle. In some example embodiments, the communications request message may include a request for a response message. If the request message includes a request for a response, the response to the request message may be the first transmission by the second vehicle related to the communications with the first vehicle.

In some example embodiments, the generated radio identifier may be locally unique. For example, a locally unique radio identifier may be an identifier that is unique within a region but not necessarily unique worldwide. In some example embodiments, the generated radio identifier may be globally unique. For example, a globally unique identifier may be unique worldwide.

In some example embodiments, first vehicle 110 may include an optical apparatus configured to capture one or more optical features of vehicles and objects in the vicinity of first vehicle 110. In some example embodiments, the optical apparatus may be an image sensor or a camera, such as camera 140, configured to record one or more images and/or video of one or more areas surrounding first vehicle 110. In some example embodiments, first vehicle 110 may receive the one or more image from another source rather than recording the image/video from camera 140. For example, first vehicle 110 may receive one or more images taken by another vehicle or a camera not part of first vehicle 110 via a digital communications link such as a cellular data link, WiFi, WiMax, or any other digital communications link. License plate information from one or more vehicles in the one or more images may be used to produce one or more radio identifiers. In some example embodiments, vehicle 110 may include multiple optical apparatus or devices that may be positioned around vehicle 110 to capture information about vehicles behind and/or along the sides of vehicle 110 in addition to the forward facing camera 140 shown in FIG. 1.

In some example embodiments, a processor in camera 140 and/or a processor in radio 115 may perform optical character and/or pattern recognition. For example, an image/video captured by camera 140 may be processed at camera 140 or processed at radio 115 (or by another apparatus at vehicle 110) by an image/pattern recognition processor. The image/pattern recognition processor may determine the letters, numerals, and/or symbols on a registration/license plate on another vehicle such as license plate 145 on second vehicle 130 in FIG. 2.

In some example embodiments, the image/pattern recognition processor may determine information encoded in one dimensional or two dimensional bar code(s) on second vehicle 130. For example, if the second vehicle includes a quick response code (QR Code) (which is viewable by camera 140 or another camera or optical sensor on first vehicle 110), the QR Code may include information that may be used to identify second vehicle 130. In some example embodiments, registration/license plate information and/or other identification information for second vehicle 130 may be encoded on the bar code. Based on the registration/license plate 145 and/or bar code information and/or other information, a radio identifier may be generated for second vehicle 130.

In some example embodiments, first vehicle 110 may include a radio frequency and/or an optical communication link such as radio 115. Radio 115 may be capable of communicating through medium 120 to another radio such as radio 125 at second vehicle 130. In some example embodiments, the radio identifier generated may be based on license plate or other information and may be used to address communications to the second vehicle's radio 125 from the first the vehicle's radio 115. For example, radio 115 may generate a communications request, invite message, or broadcast message to be transmitted from first vehicle 110. In some example embodiments, the request message sent from first vehicle 110 may include the radio identifier generated from, for example, the captured license plate number 145 for second vehicle 130. The request message may also include additional information about first vehicle 110 such as a radio identifier for first vehicle 110 and/or application layer messages (for example, driving alerts or other information). Radio(s) 115 and/or 125 may be radios dedicated to vehicle-to-vehicle communications and/or vehicle-to-fixed station communications, although the radio (s) may be used for other purposes as well. In some example embodiments, radio(s) 115 and/or 125 may include cellular radios of 3G/4G or other cellular radio standards. Radios 115 and 125 may include WiFi, WiMax, NFC, or any other radio technology as well.

Radio 125 of second vehicle 130 may periodically or continuously receive or listen for messages sent from other vehicles or fixed (base) stations. When radio 125 receives a message containing a communication request or invitation that includes the radio identifier for second vehicle 130, radio 125 may send a response message to the request. The response message may contain additional information about second vehicle 130, such as position information, velocity information, communication capability information, image information and/or other information. For example, a response message or subsequent message may include information about the speed and/or position of second vehicle 130 or information about the future or anticipated future position and/or speed of second vehicle 130. A response message or a subsequent message may include information about the communications capability of second vehicle 130. In some example embodiments, the response message or subsequent message sent to vehicle 110 may include images/video of other vehicles surrounding second vehicle 130 that may also be in the vicinity of first vehicle 110. In some example embodiments, second vehicle 130 may receive instructions in the request information. Vehicle 130 may respond to the instructions as appropriate. For example, the request from vehicle 110 may include instructions to vehicle 130 to reply to the request with certain information about second vehicle 130. Second vehicle 130 may include the requested information in the response to vehicle 110. In some example embodiments, first vehicle 110 may send information to second vehicle 130 including the radio identifier without causing a response message to be sent from second vehicle 130.

In some example embodiments, instead of, or in addition to, communicating with second vehicle 130, first vehicle 110 may communicate with a fixed station (for example, base station, access point, relay, and so on). For example, a fixed station may include a roadside infrastructure radio that may be equipped with one or more sensors and/or cameras and/or image/pattern recognition processors to identify vehicles as they pass the fixed station. For example, the fixed station radio may broadcast the registration/license plate information and/or radio identifiers of vehicles passing by. The fixed station may broadcast road or traffic information as well.

Figure 2:
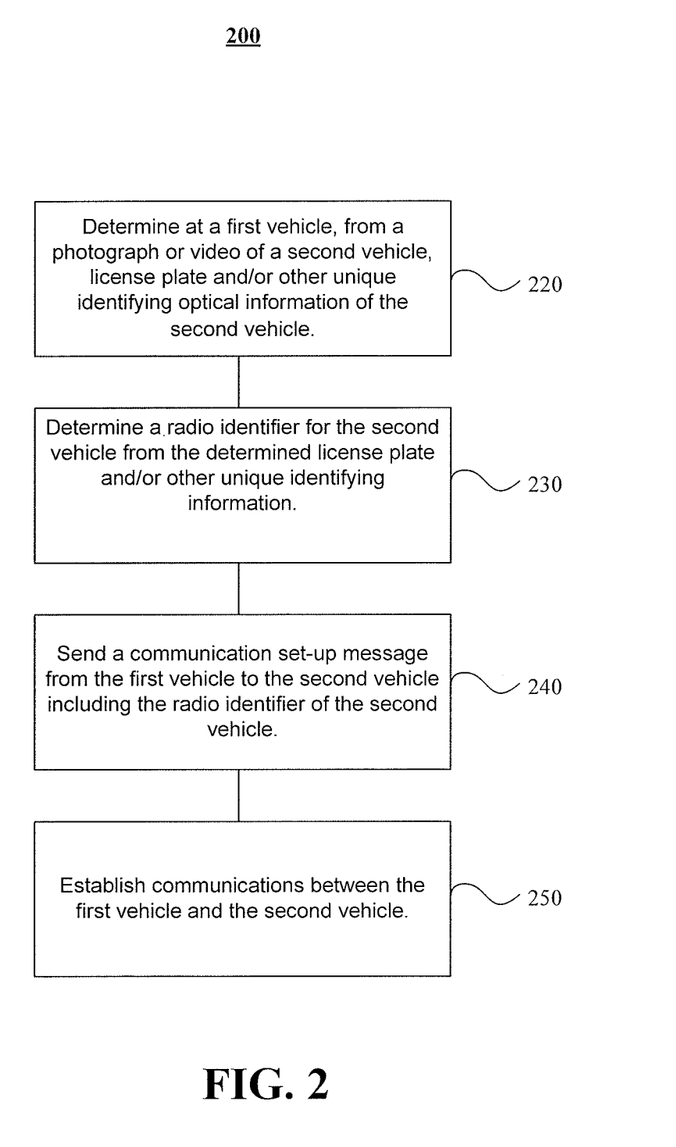
FIG. 2 depicts a process for establishing communications between vehicles, in accordance with some example embodiments.

FIG. 2 depicts a process 200 for establishing communications between vehicles, in accordance with some example embodiments. At 220, an optical feature of a second vehicle may be determined at a first vehicle from a picture of the second vehicle. At 230, a radio identifier is generated at the first vehicle for the second vehicle. At 240, a communication set-up message may be sent from the first vehicle to the second vehicle. At 250, communications between the first and second vehicles may be established. The description of FIG. 2 refers to FIG. 1.

At 220, an optical feature of a second vehicle may be determined at a first vehicle from a picture of the second vehicle, in accordance with some example embodiments. In some embodiments, an optical sensor, such as a camera, takes a picture or video that includes one or more images of the registration/license plate of another vehicle, such as the second vehicle 130 in FIG. 1. For example, camera 140 in FIG. 1 may take a picture and/or video of registration/license plate 145 on second vehicle 130. Alternatively or additionally, the optical sensor or camera may, in some example embodiments, may take a picture/video or otherwise optically detect a one dimensional or two dimensional barcode on second vehicle 130. The one dimensional or two dimensional barcode may be located on the license plate 145 and/or at another location on vehicle 130. In some embodiments, a picture may be received by the first vehicle 110 from a source other than camera 140 or other sensor on vehicle 110. Other sources of the picture may include other vehicles or a fixed station.

At 230, a radio identifier is generated at the first vehicle for the second vehicle, in accordance with some example embodiments. In some example embodiments, a radio identifier may be generated from the determined registration/license plate information. In some example embodiments, a radio identifier may be generated based on a one dimensional and/or two dimensional bar code on the second vehicle. In some example embodiments, a function may be applied to the license plate number and/or bar code that transforms the license plate/bar code into another number or value. For example, one or more of a hash function, a look-up table, or other mathematical transformation may be used to transform license plate information into a different value.

At 240, a communication set-up message may be sent from the first vehicle 110 to the second vehicle 130, in accordance with some example embodiments. For example, the set-up message may include a communications request message or an invitation message. The set-up message may be sent from the first vehicle's radio 115 to the second vehicle's radio 125. In some example embodiments, the radio(s) 115 and/or 125 may include cellular radios of 3G/4G or other cellular radio standards. Radios 115 and 125 may also include WiFi, WiMax, or any other data link or protocol as well. Radios 115 and/or 125 may be dedicated radios, or they may use other available radios such as a cellular data link of a mobile device of a driver or passenger. The request or invitation may include the radio identifier generated at the first vehicle 110 for the second vehicle 130. The radio identifier may be based on the optical features of the second vehicle determined from the photograph or video of second vehicle 130. Other information including instructions may be sent to the second vehicle as well. For example, the invitation or request may include instructions for the second vehicle 130 to provide certain information with its response to the request or invitation. In some example embodiments, the instructions may include a request for position and/or velocity and/or future predicted position/velocity information about second vehicle 130. In some embodiments, the second radio 125 of the second vehicle is periodically or continuously listening via a receiver in radio 125 for messages containing a communications identifier for the second vehicle. Second vehicle 130 may respond to instructions and/or reply with a response message to request or invitations messages containing the communications identifier for the second vehicle.

At 250, communications between the first and second vehicles may be established, in accordance with some example embodiments. In some example embodiments, communications may be established when radio 125 receives a communications set-up message including the radio identifier for second vehicle 130 generated at first vehicle 110 and sent from radio 115 to radio 125. In some example embodiments, communications may be established after radio 125 receives the set-up message and further replies to radio 115 with a response message. The response message may include information that was requested in the set-up message received from radio 115.

Figure 3:
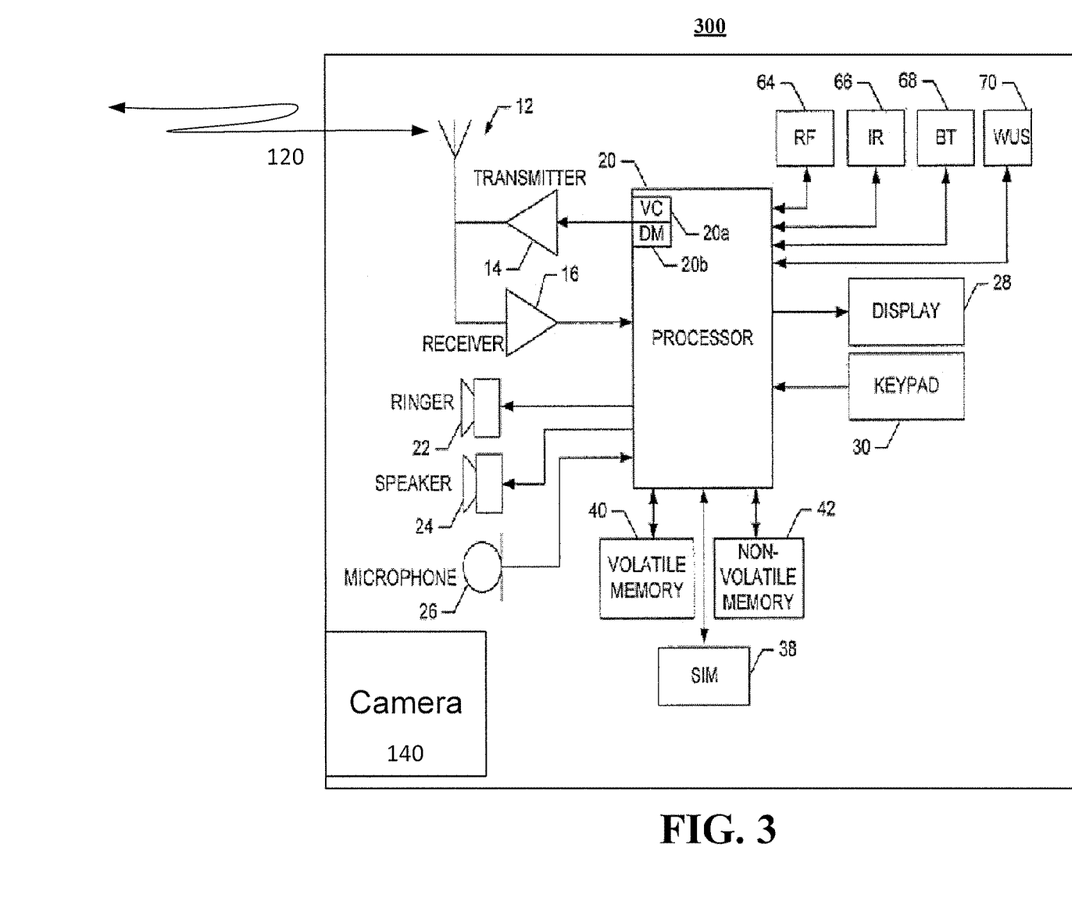
FIG. 3 depicts an example of an apparatus, in accordance with some example embodiments.

FIG. 3 depicts an example of an apparatus 300, in accordance with some example embodiments. Radio 115 may comprise the apparatus 300 of FIG. 3 or any portion thereof. Apparatus 300 may comprise a user equipment such as a cellular telephone, a smartphone, a wireless node of a wireless network, and/or any other radio.

In some example embodiments, the apparatus 300 may include camera 140 in FIG. 1. In some embodiments camera 140 may be external to apparatus 300 but connected to apparatus 300 via a wired or wireless interface. In some example embodiments, radio 125 in FIG. 1 may be implemented in a manner similar to radio 115. In some example embodiments, apparatus 300 of radio 115 may establish communications to another apparatus 300 of another radio, such as radio 125, using a dedicated or local radio without utilizing a cellular service.

In some example embodiments, apparatus 300 may include a radio communication link to a cellular network, or other wireless network. Apparatus 300 may send a message to a network node of the radio network indicating the capabilities of apparatus 300. For example, apparatus 300 may indicate to the network node that its capabilities include vehicle-to-vehicle (V2V) communications and/or vehicle-to-infrastructure (V2I) communications. The network node may enable the apparatus 300 to use its V2V and/or V2I communication and/or the network node may request that apparatus 300 forward video and/or photographs from one radio to another such as from radio 125 to radio 115.

The apparatus 300 may include at least one antenna 12, a transmitter 14, and a receiver 16. Alternatively transmit and receive antennas may be separate. The apparatus 300 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 130 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 300 may include a location processor and/or an interface to obtain location information, such as positioning and/or navigation information. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local area network (WLAN) techniques, such as, Institute of Electrical and Electronics Engineers (IEEE) 802.11, 802.16, and/or the like. In addition, these signals may include speech data, user generated data, user requested data, and/or the like.

The apparatus 300 may be capable of operating with one or more air interface standards, communication protocols, modulation types, access types, and/or the like. For example, the apparatus 300 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 300 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 300 may be capable of operating in accordance with 2.5G wireless communication protocols General Packet Radio Service (GPRS), Enhanced Data GSM Environment (EDGE), and/or the like. Further, for example, the apparatus 300 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 300 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 300 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 300. For example, the processor 20 may comprise a digital signal processor device, a microprocessor device, an analog-to-digital converter, a digital-to-analog converter, and/or the like. Control and signal processing functions of the apparatus 300 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 300 to perform actions. For example, processor 20 may be capable of operating a connectivity program, such as, a web browser. The connectivity program may allow the apparatus 300 to transmit and receive web content, such as location-based content, according to a protocol, such as, wireless application protocol, WAP, hypertext transfer protocol, HTTP, and/or the like.

Apparatus 300 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 300 may include a battery for powering various circuits related to the mobile terminal, for example, a circuit to provide mechanical vibration as a detectable output. The user input interface may comprise devices allowing the apparatus 300 to receive data, such as, a keypad 30 (which can be a virtual keyboard presented on display 28 or an externally coupled keyboard) and/or other input devices.

Moreover, the apparatus 300 may include a short-range radio frequency (RF) transceiver and/or interrogator 64, so data may be shared with and/or obtained from electronic devices in accordance with RF techniques. The apparatus 300 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 300 and, in particular, the short-range transceiver may be capable of transmitting data to and/or receiving data from electronic devices within a proximity of the apparatus, such as within 10 meters. The apparatus 300 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 300 may comprise memory, such as, a subscriber identity module (SIM) 38, a removable user identity module (R-UIM), and/or the like, which may store information elements related to a mobile subscriber. In addition to the SIM, the apparatus 300 may include other removable and/or fixed memory. The apparatus 300 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 300. The functions may include one or more of the operations disclosed herein with respect to vehicle communications using license place identifiers including the process flow of FIG. 2, and the like. The memories may comprise an identifier, such as, an international mobile equipment identification (IMEI) code, capable of uniquely identifying apparatus 300. In the example embodiment, the processor 20 may be configured using computer code stored at memory 40 and/or 42 to provide the operations disclosed with respect to the process shown in FIG. 2 and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 1, 2 and/or 3. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIG. 2, and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, Wi-Fi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   receiving, from a sensor, an image of a vehicle including identifying information of the vehicle;
   generating, based on the identifying information, an identifier for the vehicle;
   generating, based on a different part of the identifying information, a security key for the vehicle; and
   sending a message to the vehicle, wherein the message includes the security key and the generated identifier to at least identify a destination address of the message.

2. The method of claim 1, wherein the message comprises a communications request message to initiate communications with the vehicle.

3. The method of claim 2, wherein the communications request message includes a request for specific content to be provided in a response message sent by the vehicle.

4. The method of claim 1, wherein the message comprises at least one of an instruction to the vehicle, a warning to the vehicle, a communication set-up information, or a quality of service information.

5. The method of claim 1, wherein the sensor is at least one of a still camera, a video camera, a laser-based optical sensor, a scanning detector, a radio frequency imaging apparatus, or an electromagnetic sensor.

6. The method of claim 1, wherein the identifier is at least one of a radio identifier, an address, or a destination address.

7. The method of claim 6, wherein the radio identifier is at least one of a wireless access in vehicular movements identifier, a direct short-range communications identifier, a wireless local area network identifier, or a cellular communications network identifier.

8. The method of claim 1, wherein the identifier is an application level identifier.

9. The method of claim 1, wherein the image includes at least one of a license plate number for the vehicle, a registration number for the vehicle, a one dimensional bar code associated with the vehicle, or a two dimensional bar code associated with the vehicle.

10. The method of claim 1, wherein the image comprises information determined from an electromagnetic sensor or an acoustic sensor.

11. An apparatus comprising:
- at least one processor; and
- at least one memory including computer program code, the at least one processor, the at least one memory, and the computer program code configured to cause the apparatus to at least:
- receive, from a sensor, an image of a vehicle including identifying information of the vehicle;
- generate, based on the identifying information, an identifier for the vehicle;
- generate, based on a different part of the identifying information, a security key for the vehicle; and
- send a message to the vehicle, wherein the message includes the security key and the generated identifier to at least identify a destination address of the message.

12. The apparatus of claim 11, wherein the message comprises a communications request message to initiate communications with the vehicle.

13. The apparatus of claim 12, wherein the communications request message includes a request for specific content to be provided in a response message sent by the vehicle.

14. The apparatus of claim 11, wherein the message comprises at least one of an instruction to the vehicle, a warning to the vehicle, a communication set-up information, or a quality of service information.

15. The apparatus of claim 11, wherein the sensor is at least one of a still camera, a video camera, a laser-based optical sensor, a scanning detector, a radio frequency imaging apparatus, or an electromagnetic sensor.

16. The apparatus of claim 11, wherein the identifier is at least one of a radio identifier, an address, or a destination address.

17. The apparatus of claim 16, wherein the radio identifier is at least one of a wireless access in vehicular movements identifier, a direct short-range communications identifier, a wireless local area network identifier, or a cellular communications network identifier.

18. The apparatus of claim 11, wherein the identifier is an application level identifier.

19. The apparatus of claim 11, wherein the image includes at least one of a license plate number for the vehicle, a registration number for the vehicle, a one dimensional bar code associated with the vehicle, or a two dimensional bar code associated with the vehicle.

20. The apparatus of claim 11, wherein the image comprises information determined from an electromagnetic sensor or an acoustic sensor.

* * * * *